(12) United States Patent
Sasaki et al.

(10) Patent No.: US 7,822,014 B2
(45) Date of Patent: Oct. 26, 2010

(54) VOICE COMMUNICATION SYSTEM AND A SERVER APPARATUS

(75) Inventors: Ryo Sasaki, Saitama (JP); Yukari Kondou, Saitama (JP); Keizo Ikeda, Ohoba (JP); Shinji Usuba, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 1187 days.

(21) Appl. No.: 10/579,677

(22) PCT Filed: Nov. 19, 2004

(86) PCT No.: PCT/JP2004/017261

§ 371 (c)(1), (2), (4) Date: May 18, 2006

(87) PCT Pub. No.: WO2005/050962

PCT Pub. Date: Jun. 2, 2005

(65) Prior Publication Data
US 2007/0147343 A1 Jun. 28, 2007

(30) Foreign Application Priority Data
Nov. 21, 2003 (JP) ............................. 2003-392569

(51) Int. Cl.
*H04L 12/66* (2006.01)
(52) U.S. Cl. .................... 370/352; 370/357; 379/90.01
(58) Field of Classification Search ......... 370/352–357, 370/389; 379/90.01, 93.01
See application file for complete search history.

(56) References Cited

U.S. PATENT DOCUMENTS 6,104,704 A * 8/2000 Buhler et al. ............... 370/252
6,252,869 B1 * 6/2001 Silverman .................. 370/352
6,968,367 B1 * 11/2005 Vassar et al. ............... 709/219
2001/0005382 A1 * 6/2001 Cave et al. .................. 370/466

FOREIGN PATENT DOCUMENTS

| GB | 2 408 409 A | 5/2005 |
| JP | 10-303891 A | 11/1998 |
| JP | 2003-224681 A | 8/2003 |
| JP | 2003-256308 A | 9/2003 |
| WO | WO 02-093959 A1 | 11/2002 |
| WO | WO 03/058403 A2 | 7/2003 |

OTHER PUBLICATIONS

Examination Report under Section 18(3) dated Sep. 11, 2006, issued in GB0609392.6.

* cited by examiner

*Primary Examiner*—Suhan Ni
(74) *Attorney, Agent, or Firm*—Rabin & Berdo, P.C.

(57) ABSTRACT

A voice communication system transfers voice information stored in a protocol data unit under a predetermined communication protocol over a network, and includes end voice terminals for transferring and receiving the voice information, and a management server for managing said end voice terminal. The management server includes a manager for storing subscriber information indicative of whether or not the end voice terminals are provided with the capability of predetermined broadband voice communication. A user is informed, at the latest before the user initiates a call from the end voice terminal, of whether or not a telephone set of a called party is provided with the capability of the broadband voice communication through the end voice terminal based on the subscriber information. running in a network under a predetermined communication. This increases the satisfaction of the user and allows a business model justifying charging customers to be built.

4 Claims, 8 Drawing Sheets

VOICE COMMUNICATION SYSTEM AND A SERVER APPARATUS

TECHNICAL FIELD

The present invention relates to a voice communication system using, for example, VoIP (Voice Over IP) technology and to a server apparatus serving as a component of a voice communication system.

BACKGROUND ART

A conventional analog telephone service is a voice band-limited service adapted such that audio frequency components higher than 3.4 kHz are suppressed to be transmitted. End users communicate with others generally within the limited band. IP telephony services using VoIP technology are also made compatible with connections to a conventional analog telephone network or to traditional telephone subscriber sets to accomplish telecommunications services generally within the aforementioned limited voice band.

Such an IP telephony service over an IP (Internet Protocol) network is however possibly provided which is free from the restriction of the conventional analog telephone service, i.e. limiting the frequency components higher than 3.4 kHz, and transmits voice signals in a wideband (with its bandwidth of 3.4 KHz or more) to increase the quality of service for communication services (hereinafter, referred to as "high-quality IP telephony service").

However, in order to provide such a high-quality IP telephony service as a payable service that is acceptable to customers, the problems described below arise from the viewpoints of satisfaction to the customers, and therefore a business model that would justify charging the customers has been difficult to build.

Specifically, when an end user originates a call from his or her IP telephone subscriber set on an IP network supporting the high-quality IP telephony service, the telephone subscriber set of a called party is identified by the phone number specified by the calling end user. When the calling end user dials a phone number, he or she may usually not be aware of whether or not the telephone set corresponding to the dialed phone number is compatible to the high-quality IP telephony service. Resultantly, it is occasional for the calling party, and hence determined afterwards, whether or not the called party will enjoy a chargeable high-quality IP telephony service subscriber. In this situation, it is difficult to get acceptance from the called party in every case.

For example, when a dialed phone number is the phone number of an ordinary telephone set on a public switched network supporting the analog telephone service, the telephone service is provided such that the voice frequency components higher than 3.4 kHz are suppressed so as to be of substantially the same quality of service as the analog telephone service. By contrast, when a dialed phone number is the phone number of an IP telephone set on an IP telephone network supporting the high-quality IP telephony service, the user will enjoy the high-quality IP telephony service on broadband voice signals. In those examples, the former applies a free service in the service quality comparable to the analog telephone service, whereas the latter does a toll service in the high-quality IP telephony service.

DISCLOSURE OF THE INVENTION

It is an object of the present invention to provide a voice communication system and a server apparatus capable of providing a user with a high-value added service to increase the acceptance by the user and user satisfaction, as well as a high quality fee-based service.

The present invention provides as a characterized aspect a voice communication system for transferring voice information stored in a protocol data unit under a predetermined communication protocol over a network under the protocol, the system comprising an end voice terminal for transferring and receiving the voice information in the protocol data unit, and a management server for managing the end voice terminal, the management server including a management information storage for storing subscriber information indicative of whether or not the end voice terminal is provided with manager for managing subscriber information indicative of predetermined broadband voice communication, a user being informed, at the latest before the user initiates a call from the end voice terminal, of whether or not a telephone set of a called party is provided with the capability of the broadband voice communication through said end voice terminal based on the subscriber information. In this case, the system may comprise an audio source server for providing high quality voice information on the broadband voice communication, the audio source server providing the end voice terminal, when provided with the capability of the broadband voice communication, with a high quality voice service on the high quality voice information. The voice communication system characterized in that.

Further, the present invention provides as a characterized aspect a method of voice communication in a voice communication system for transferring voice information stored in a protocol data unit under a predetermined communication protocol over a network under the protocol, in which the system comprises an end voice terminal serving as a sender or a receiver which the protocol data unit is sent from or meant for, and a management server for managing the end voice terminal, the method comprising the steps of allowing the management server to manage subscriber information indicative of whether or not the end voice terminal is provided with a capability of predetermined broadband communication, and informing a user, at the latest before the user initiates a call from the end voice terminal, of whether or not a telephone set of a called party is provided with the capability of the broadband voice communication through the end voice terminal based on the subscriber information.

In this case, the voice communication system may comprise an audio source server for providing high quality voice information on the broadband voice communication, the audio source server providing the end voice terminal, when provided with the capability of the broadband voice communication, with a high quality voice service on the high quality voice information.

Further, the present invention provides a server apparatus serving as a component of a voice communication system for transferring voice information stored in a protocol data unit under a predetermined communication protocol over a network under the protocol, and managing an end voice terminal for transferring and receiving the voice information in the protocol data unit, the apparatus comprising a management information storage for storing subscriber information indicative of whether or not the end voice terminal is provided with a capability of predetermined broadband communication, a user being informed, at the latest before the user initiates a call from the end voice terminal, of whether or not a telephone set of a called party is provided with the capability of the broadband voice communication through the end voice terminal based on the subscriber information.

Further, the present invention provides a server apparatus serving as a component of a voice communication system for transferring voice information stored in a protocol data unit under a predetermined communication protocol over a network under the protocol, and providing a high quality voice service on high quality voice information, the apparatus sending the high quality voice information on the predetermined broadband voice communication meant for an end voice terminal serving as a sender or a receiver which the protocol data unit is sent from or meant for and provided with a capability of predetermined broadband communication.

Incidentally, the end voice terminal is a communication terminal provided with at least the capability of voice communication, and may be, for example, a combination, as an end voice terminal, of an IP telephone adaptor apparatus, a personal computer and an adaptive telephone.

According to the present invention, high-value added services that increase the acceptance by the user and the user satisfaction are provided, and a business model that provides high quality fee-based service can be built.

BRIEF DESCRIPTION OF THE DRAWINGS

The objects and features of the present invention will become more apparent from consideration of the following detailed description taken in conjunction with the accompanying drawings in which.

BEST MODE FOR CARRYING OUT THE INVENTION

Figure 1:
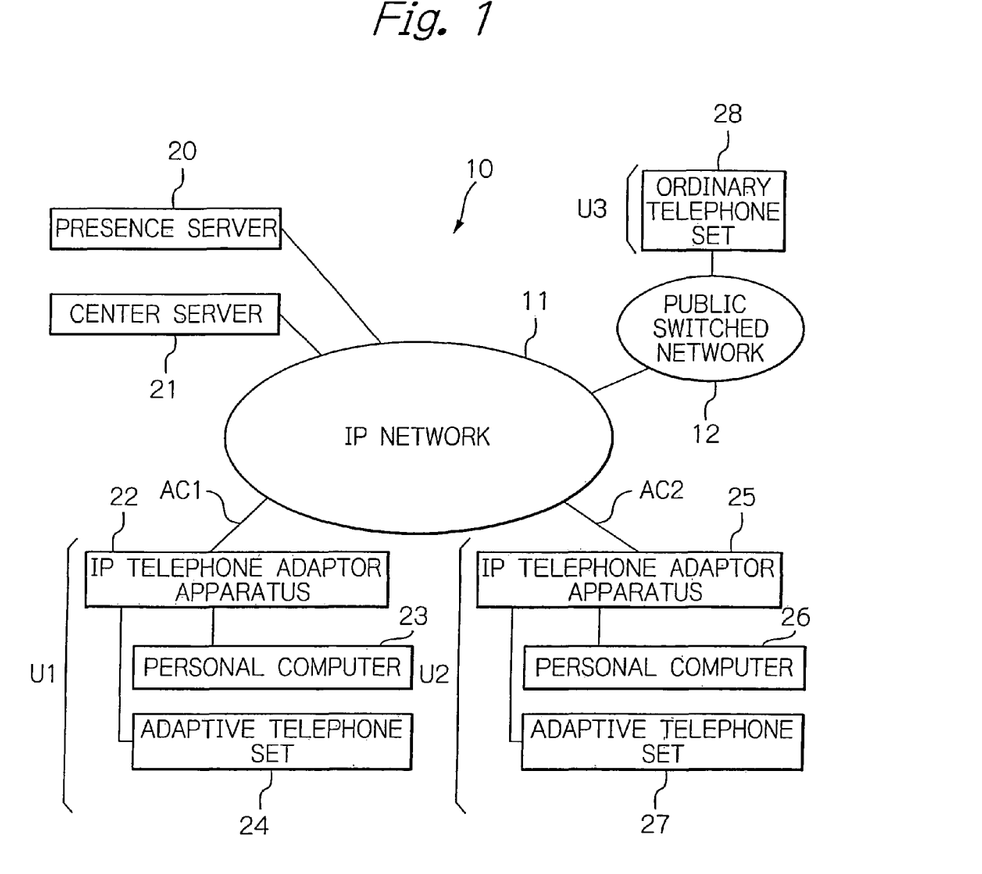
FIG. 1 schematically shows an exemplary overall configuration of a VoIP system according to a first embodiment.

Hereinafter, embodiments of a VoIP system to which a voice communication system and a server system according to the invention are applied will be described with reference to the accompanying drawings. An exemplary overall configuration of a first embodiment of a VoIP system 10 to which the invention is applied is shown in FIG. 1. In FIG. 1, the VoIP system 10 comprises an IP network 11, a public switched network 12, a presence server 20, a center server 21, IP (Internet protocol) telephone adaptor apparatuses 22, 25, personal computers 23, 26, adaptive telephone subscriber sets 24, 27, an ordinary telephone subscriber set 28, and access lines (AC1, AC2).

In the VoIP system, the IP network 11 is a network that is managed and operated by a particular telecommunications carrier or an ISP (Internet Service Provider), and uses an IP protocol corresponding to the network layer of the OSI reference model. The present IP network 11 provides an IP telephony service based upon the VoIP (Voice Over IP) technology. Although not shown in the figure, the IP network 11 includes various network devices such as a router, an L2 switch and the like.

The public switched network 12 is the so-called Public Switched Telephone Network (PSTN,) and the above-described analog telephone service is provided within the public switched network 12. The connections between the IP network 11 and the public switched network 12 are not limited to the connections shown in FIG. 1, but may be other connections. When the IP network 11 and the public switched network 12 are connected as shown in the figure, a VoIP gateway (not shown) is used as the connection point between the networks 11 and 12. Further, it may be contemplated that the Internet (not shown) is connected, if desired, to the IP network 11.

The IP network 11 and the individual IP adaptor apparatuses 22, 25 are connected to each other by the access lines (AC1, AC2), respectively. The access lines (AC1, AC2) may be a transmission line whose transmission rate is high enough to allow the system to accomplish broadband real-time voice communications. Note that depending on methods of encoding voice signals, a transmission rate needed for broadband voice transmission is likely to be substantially the same as needed for voice communications occupying a frequency band substantially equivalent to that of an analog telephone service.

Connected to the IP network 11 are the personal computer 23 and the adaptive telephone set 24 by the access line (AC1) and the IP telephone adaptor apparatus 22. Further, connected to the IP network 11 are the personal computer 26 and the adaptive telephone set 27 by the access line (AC2) and the IP telephone adaptor apparatus 25. The personal computers 23, 26 may of course be logically connected to the IP network 11, and may not necessarily physically be connected to the IP telephone adaptor apparatuses 22, 25. In the instant embodiment, the personal computer 23 and the adaptive telephone set 24 are used by a user (U1), and the personal computer 26 and the adaptive telephone set 27 are used by a user (U2).

In principle, a combination of the IP telephone adaptor apparatus 22 and the adaptive telephone set 24 serves as a single IP telephone terminal capable of implementing broadband voice communication based on the above-described high-quality IP telephony service. On the contrary, the personal computer 23 provides an auxiliary user interface for allowing a user to benefit from the high-quality IP telephony service. Likewise, a combination of the personal computer 26 and the IP telephone adaptor apparatus 25 serves as a single IP telephone capable of implementing broadband voice communication, and the personal computer 26 provides an auxiliary user interface for allowing a user to benefit from the high-quality IP telephony service.

Different systems having a specific bandwidth are applicable to such broadband voice communication. As an example, it may be contemplated to utilize an analog telephone service with its bandwidth (300-3400 Hz) expanded to a wider bandwidth (50-7000 Hz). In this case, the expansion of the higher region of the bandwidth allows English consonants or the sounds of insects to be clearly heard, which would otherwise be difficult to hear. In addition, the expansion of the lower region of the bandwidth causes audible output to be natural to listen as it is, thus improving the sound quality.

The high-quality IP telephony service is a fee-based service provided by a telecommunications carrier or ISP who manages and operates the IP network 11. The high-quality IP telephony service is provided as a highly value-added service to the IP network 11.

The center server 21 connected to the IP network 11 may be a call control server corresponding, for example, to an SIP (Session Initiation Protocol) server or a gatekeeper according to ITU-T Recommendations H.323.

The presence server 20, specific to the instant embodiment, is a server apparatus that stores and manages information (subscriber information WC) indicative of whether or not the IP telephone adaptor apparatuses 22, 25 on the IP network 11 are usable for the purpose of the above-described high-quality IP telephony service. If desired, the presence server 20 may operate in cooperation with the center server 21. The center server 21 and the presence server 20 are the equipment operated by a telecommunications carrier.

Connected to the public switched network 26 is an ordinary telephone set 28 that is able to establish voice communication on said analog telephone service that utilizes the bandwidth up to 3.4 KHz. The ordinary telephone set 28 is used by a user (U3).

Figure 2:
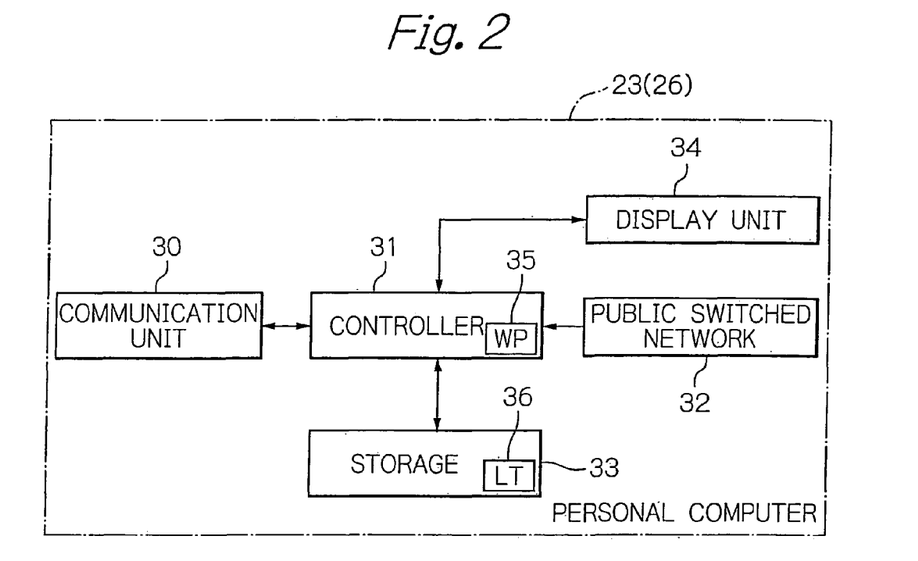
FIG. 2 schematically shows an exemplary general configuration of the primary part of the personal computer.

Hereinafter, an example in which the user (U1) on the side of the IP telephone adaptor apparatus 22 initiates (originates) a call to the user (U2) or (U3) will be mainly described. The internal configuration of the personal computer 23 is shown in FIG. 2. The internal configuration of the personal computer 26 is the same as that of the computer 23. As shown in the figure, the exemplified internal configuration of the personal computer 23 includes a communication unit 30, a controller 31, an operation unit 32, a storage 33, and a display unit 34.

In the personal computer 23, the communication unit 30 is operable to communicate with the presence server 20 or the center server 21 via the IP telephone adaptor apparatus 22. Communications of the communication unit 30 with the center server 21 are carried out, for example, when the IP telephone adaptor apparatus 22 initiates a call to another IP telephone adaptor apparatus (e.g. IP telephone adaptor apparatus 25) capable of implementing broadband voice communication, whereas communications with the presence server 20 are carried out when a page of information (e.g. a call originating web page LT) to be provided by the presence server 20 is viewed on the personal computer 23. A page of information (a call originating web page LT 36) may be of the type to be sent in the form of Web page, and is stored in the storage 33 of the personal computer 23.

When implemented in the form of hardware, the controller 31 corresponds to a CPU (Central Processing Unit) of the personal computer 23, and when implemented in the form of software, it corresponds to various program sequences such as OS (Operating System), Web Portal (WP) 35, etc. Note that the Web Portal (WP) 35 runs on a Web Browser and comprises software packages that provide dialing capability.

The operation unit 32 is manipulated by a user (U1) to input an instruction to the personal computer 23, and includes, for example, a pointing device, such as a mouse, and a keyboard.

The display unit 34 serves as a display device that invokes application software (e.g. said Web portal (WP) 35, etc.), installed on the personal computer 23, for visualizing an image on its screen. A displayed image which the Web portal (WP) 35 visualizes on the basis of a Web page (a page of information) received from the presence server 20 is an example of such an image.

Although there can be many different types of styles used to present Web pages, in view of the configuration of this embodiment, the call originating web page (LT) 36 is considered important. The call originating web page (LT) 36 is a page accessed by a user (U1) who wishes to initiate a call over broadband voice communication, and contains an indication (indication of a called party) of information on called party identity, e.g. the name, phone number, etc., of a user (i.e. user (U2)) possessing the IP telephone adaptor apparatus having its capability of broadband voice communication. The user (U1) operates the operation unit 32 while viewing the call originating web page (LT) 36 on the screen of the display unit 34, and points with click the indication of a called party as a desired destination to use the dialing function for placing a call. In this manner, it becomes possible to simply and reliably place a call to the IP telephone adaptor apparatus (or adaptive telephone) that is provided with a capability to implement broadband voice communication (broadband voice telephone capability).

The presence server 20 detects almost in real time the connections of the IP telephone adaptor apparatuses. For example, it may be contemplated that, when the IP telephone adaptor apparatus is in its busy state, the presence server displays on the call originating web page (LT) 36 an indication that the apparatus is in its busy state, and/or eliminates the destination indication of that IP telephone adaptor apparatus from the call originating web page (LT) 36. This allows the user (U1) to designate with click, on the call originating web page (LT) 36, only the destination indication of the IP telephone adaptor apparatus currently available for the user to make broadband voice communication.

Incidentally, it is needless to say that instead of the use of the call originating web page (LT) 36, a user can use the adaptive telephone set 24 (through usual operation of buttons to specify the phone number of a called party, etc.) to initiate a call to other telephones such as an ordinary telephone set 28, etc.

From the viewpoint of hardware, the storage 33 is a storage resource comprised of RAM (Random Access Memory), hard disk, etc., and from the viewpoint of software, the storage includes various sorts of files. Since a program file such as said Web portal (WP) 35 is one of those files, the physical substance of the files is located in the storage 33. The Web page (LT) 36 that has been received from the presence server 20 is also stored in the storage 33.

Figure 3:
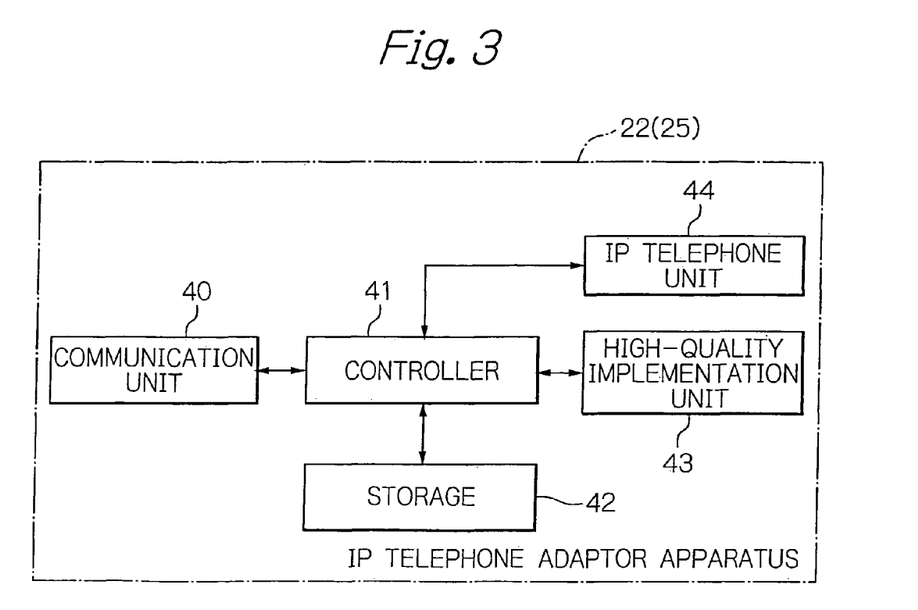
FIG. 3 schematically shows an exemplary general configuration of the primary part of the IP adaptor apparatus.

The internal configuration of the IP telephone adaptor apparatus 22 housing the personal computer 23 and the adaptive telephone set 24 may be the same as shown in FIG. 3. The internal configuration of the IP telephone adaptor apparatus 25 is also similar to the above configuration.

An example of the internal configuration of the IP telephone adaptor apparatus 22 will be described below. As shown in the figure, the IP telephone adaptor apparatus 22 comprises a communication unit 40, a controller 41, a storage 42, a high-quality implementation unit 43, and an IP telephone unit 44.

Among those components, the communication unit 40, the controller 41 and the storage 42 correspond to the communication unit 30, the controller 31 and the storage 33 shown in FIG. 2, respectively, and therefore the detailed description of those components will not be repeated.

It should be noted that the communication unit 40 is for communicating with the presence server 20, the center server 21 and the VoIP gateway, etc., on the side of the IP network 11, and also communicating with the personal computer 23 and the adaptive telephone set 24, both of which operate under the control of the IP telephone adaptor apparatus.

It may be considered that the IP telephone adaptor apparatus 22 acts as a kind of relay station. While the link for relaying communications between the personal computer 23 and the presence server 20 should be transparent, the link for relaying voice information between the adaptive telephone set 24 and other telephones (e.g. adaptive telephone set 27) may not be transparent. This is because the IP telephone apparatus 22 is provided with the function of broadband voice communication.

The IP telephone unit 44 provides functions required for IP telephony. All the functions required for IP telephony can be distributed between the IP telephone unit 44 and the adaptive telephone set 24, and therefore the functions owned by the IP telephone unit 44 are dependent upon which of all the functions are to be allotted to the adaptive telephone set 24.

If the adaptive telephone set 24 is required to provide only a user interface to the user (U1), all the functions of the VoIP gateway (gateway other than the gateway located between the IP network 11 and the public switched network 12) will be incorporated into the IP telephone unit 44. In this case, the adaptive telephone set 24 itself may have essentially the same configuration as the ordinary telephone set 28. It is however needless to say that, in order to perform broadband voice communication, the capabilities to collect voice input from the user (U1) and output a voice signal received from an opposite communication party are of appropriately collecting and outputting voice signals over the entire bandwidth of the broadband voice service.

In addition to the capability of broadband voice communication, the capability of ordinary voice communication (e.g. with the ordinary telephone set 28) through the typical IP telephony service is also provided by this IP telephone unit 44.

The high-quality implementation unit 43 is provided with the capability required for broadband voice communication. Similar to the case of the IP telephone unit 44, all the capabilities required for broadband voice communication can be distributed between the high-quality implementation unit 43 and the adaptive telephone set 24, and therefore the capabilities owned by the high-quality implementation unit 43 depend on which of all the capabilities are to be assigned to the adaptive telephone set 24.

Figure 4:
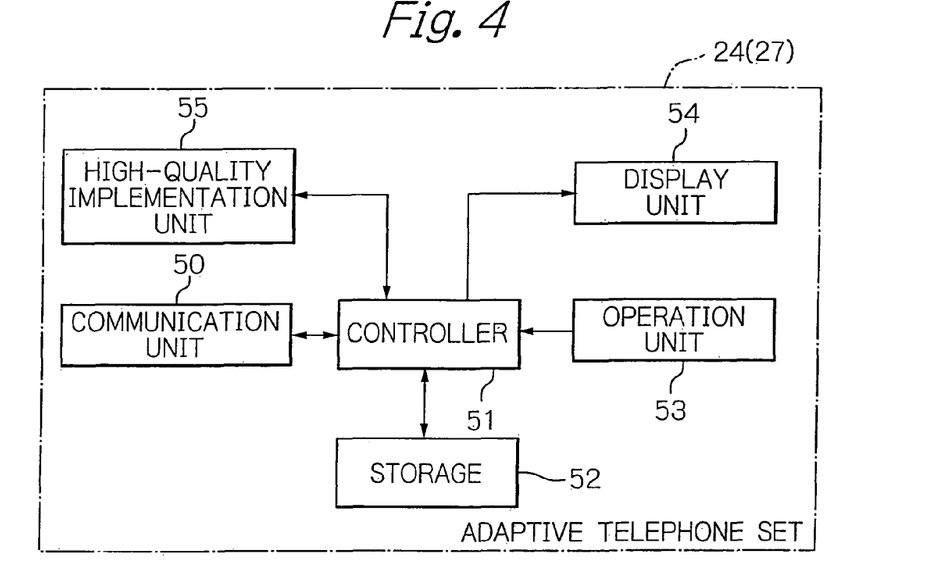
FIG. 4 schematically shows an exemplary general configuration of the primary part of the adaptive telephone.

Next, the exemplary internal configuration of the adaptive telephone set 24 operating under the control of the IP telephone adaptor apparatus 22 is shown in FIG. 4. The internal configuration of the adaptive telephone set 27 may also be the same as shown in the same figure.

As shown in the figure, the exemplary internal configuration of the adaptive telephone set 24 includes a communication unit 50, a controller 51, a storage 52, an operation unit 53, a display unit 54 and a high-quality functional unit 55.

Among those components, the communication unit 50, the controller 51, the storage 52, the operation unit 42 and the display unit 54 correspond to the communication unit 30, the controller 31, the storage 33, the operation unit 32 and the display unit 34 shown in FIG. 2, respectively, and therefore the detailed description of those components will not be repeated.

It should be noted that in view of the configuration of this embodiment, communications with the presence server 20 are enabled via the personal computer 23 and accordingly the communication unit 50 of the adaptive telephone set 24 need not to communicate directly with the presence server 20. Further, the controller 51 is not required to install program sequences used to serve as the Web portal (WP) 35.

Further, assuming that the adaptive telephone set 24 has the appearance similar to that of an ordinary telephone (e.g. the ordinary telephone set 28), the operation unit 53 is provided with buttons programmed to dial the phone number of a called party, etc. Moreover, the display unit 54 in some cases includes a lamp and a compact liquid crystal display device, etc., although it might be contemplated that the display unit 54 itself is not present in the telephone set 24.

The high-quality functional unit 55 is provided with the capability of broadband voice communication. As described above, the adaptive telephone set 24 should support the capability to appropriately collect and output voice over the entire bandwidth of broadband voice signals.

Figure 6:
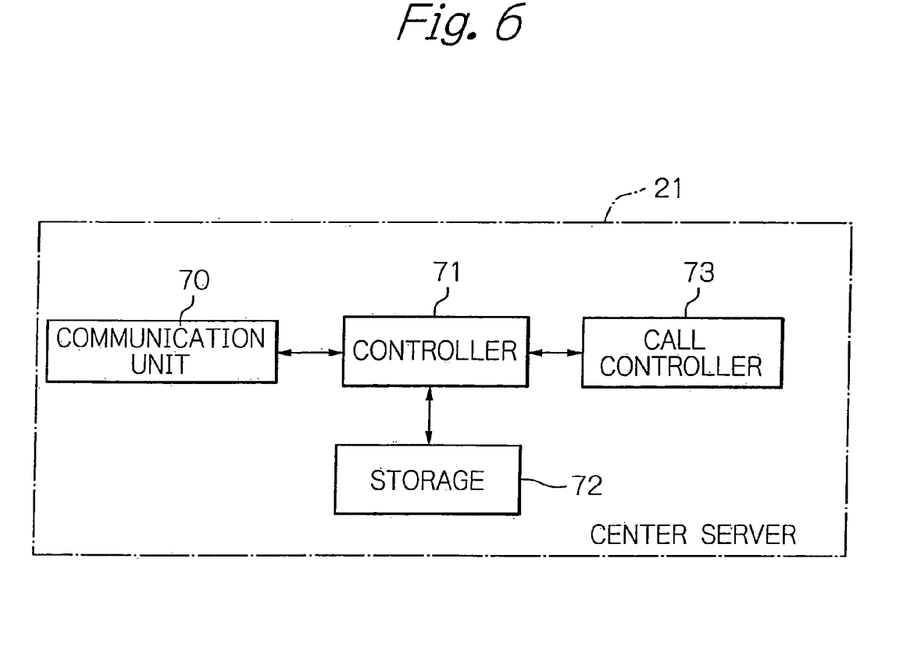
FIG. 6 schematically shows an exemplary general configuration of the primary part of the center server.

The exemplary internal configuration of the center server 21 for communicating with the personal computer 23 and the adaptive telephone set 24 via the IP telephone adaptor apparatus 22 is shown in FIG. 6. As shown in the figure, the center server 21 comprises a communication unit 70, a controller 71, a storage 72, and a call controller 73.

Among those components, the communication unit 70, the controller 71 and the storage 72 correspond to the communication unit 30, the controller 31 and the storage 33 shown in FIG. 2, respectively, and therefore the detailed description on those components will not be repeated. Incidentally, it is likely to happen that the communication unit 70 communicates concurrently with a plurality of IP telephone adaptor apparatuses and VoIP gateways included in the IP network 11.

Further, the storage 72 may include various information stored on the management of a telephone call, etc. Such information may contain information on whether or not users of the IP telephone adaptor apparatuses 22, 25 are presently busy.

The call controller 73 is adapted for controlling calls made between the IP telephone adaptor apparatuses, and between the IP telephone adapt or apparatus and the VoIP gateway (located between the IP network 11 and the public switched network 12).

Typically, a call control sequence is initiated when a calling user (e.g. user (U1)) depresses the buttons on the adaptive telephone set 24 to enter the phone number of a called party. In this case, call control procedure depends on whether a call control element supports ITU-T Recommendations H.323 or the SIP, and therefore operations carried out by the call controller 73 will be different accordingly. Note that in this embodiment, a similar call control sequence may also be initiated when the user (U1) designates with click the indication of a called party on the call originating web page (LT) 36.

Figure 5:
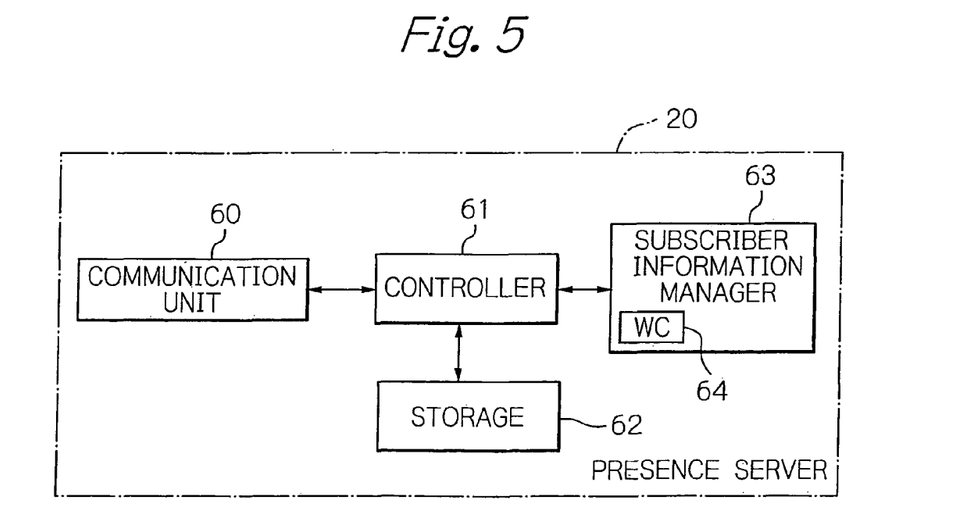
FIG. 5 schematically shows an exemplary general configuration of the primary part of the presence server.

Next, the exemplary internal configuration of the presence server 20 is shown in FIG. 5. As shown in the figure, the presence server 20 comprises a communication unit 60, a controller 61, a storage 62, and a subscriber information manager 63.

Among those components, the communication unit 60, the controller 61 and the storage 62 correspond to the communication unit 70, the controller 71 and the storage 72 shown in FIG. 6, respectively, and therefore the detailed description on those components will not be repeated.

The subscriber information manager 63 is a management information storage for storing and managing various information (subscriber information) on a subscriber (e.g. user (U1), etc.) who is subscribed to the high-quality IP telephony service. The subscriber information contains broadband availability information (WC) 64 indicative of whether or not the IP telephone adaptor apparatus of each subscriber provided to the IP network 11 is provided with the capability of broadband voice communication. It is preferred that the subscriber information contains information required for the indication of a called party, such as the name and phone number of a subscriber. Further, it is preferred that user information about a telephone set connected to the IP network 11 and not subscribed to the high-quality IP telephony service or about an IP adaptor apparatus not provided with the capability of broadband voice communication is also contained in the subscriber information.

It should be noted that although the IP adaptor apparatuses 22, 25 are shown in FIG. 1 as having the capability of broadband voice communication, an IP telephone adaptor apparatus that is not provided with the capability of broadband voice communication may be connected to the IP network 11.

The call originating web page (LT) 36 is generated by the presence server 20 when the server locates a subscriber who is provided with the capability of broadband voice communication on the basis of the broadband availability information (WC) 64 about the subscribers and thereafter identifies the name and phone number of that subscriber (i.e. the indication of a called party).

There may be the various timing requirements for causing the display unit 34 of the personal computer 23 to display the call originating webpage (LT) 36. For example, it is contemplated that the user (U1) is prompted to enter an appropriate URL, prior to off-hook on the adaptive telephone set 24b, to thereby send out from the Web portal (WP) 35 on the personal computer 23 an HTTP request message meant for the presence server 20, thus displaying the Web page on the display unit 34 at any time before off-hook. Further, it is also preferred that the display unit 34 is adapted to always display the call originating web page (LT) 36.

Where the Web portal (WP) 35 provides the capability to automatically and periodically send an HTTP request message to the specified URL, the always renewed call originating web page can be displayed. This allows changes in the connection states between the IP telephone adaptor apparatuses 22, 25 to be viewed almost on a real time basis on the call originating web page (LT) 36 displayed on the display unit 34.

When events such as the failure of the IP telephone adaptor apparatuses 22, 25, introduction of new IP telephone adaptor apparatuses, removal of the IP telephone adaptor apparatuses currently connected to the IP network 11 occur and are detected by the center server 21 or the presence server 20, the contents of the call originating web page (LT) 36 have to be updated. In this case, the call originating web page (LT) 36 is renewed. In many cases, the center server 21 is originally provided with a capability to detect the occurrence of those events within the IP network 11 and the capability to collect the connection status, and therefore the presence server 20 in cooperation with the center server 21 is able to efficiently collect such information. Such information may contain the subscriber information. It is also contemplated that the presence server 20 collects, if appropriate, said events, connection status and subscriber information, etc., from the IP telephone adaptor apparatuses 22, 25.

Hereinafter, it will be described how the illustrative embodiment having the above configuration operate. In this case also, it is assumed that a call is originated by the user (U1) to the user (U2) or (U3).

Based on the above configuration, operations of the first embodiment will be described. If the display unit 34 of the personal computer 23 is caused to always display the latest call originating web page (LT) 36 and when the user (U1) designates with click one of the called party indications displayed on the call originating web page (LT) 36 and corresponding to a desired called party, the dialing function of the Web portal (WP) 35 is enabled to execute the call control sequence.

Since the indication of a called party being displayed on the call originating web page (LT) 36 (indication of name and phone number, etc.) exclusively includes an indication specifying an IP telephone adaptor apparatus (and adaptive telephone) that is provided with the capability of broadband voice communication, the user (U1), when clicking, is able to confirm in advance that he or she is going to use the payable high-quality IP telephony service, after which he or she clicks.

Further, in respect of a busy IP telephone adaptor apparatus or a malfunctioning IP telephone adaptor apparatus, such a state may be displayed on said call originating web page (LT) 36 and/or the indication appropriate therefor may be removed from the call originating web page (LT) 36, thus permitting the user (U1) to designate only the indication of a called party corresponding to the IP telephone adaptor apparatus for which broadband voice communication is currently available, thereby enjoying greater convenience.

Operations, such as call control and real time voice communications, performed by the sections of the VoIP system 10 after a click operation are essentially the same with broadband voice communication through the high-quality IP telephony service and with ordinary voice communication through the typical IP telephony service, except for the difference in bandwidth of the voice band.

It should be noted that in the case of toll broadband voice communication billing has to be processed between the telecommunications carriers providing the high-quality IP telephony service.

When the center server 21 belonging to the telecommunications carrier determines in the call control process that a called party has an IP telephone adaptor apparatus (e.g. IP telephone adaptor apparatus 25) that is provided with the capability of broadband voice communication, the server establishes a call consistent thereto and detects the establishment of that call and so on, then being allowed to bill the calling user (U1).

If the user (U1) designates with click on the call originating web page (LT) 36 the indication of a called party corresponding to the user (U2) or the IP telephone adaptor apparatus 25, a call is established to permit broadband voice signal transmission between the user (U1) having the adaptive telephone set 24 and the user (U2) having the adaptive telephone set 27. During this call, the users (U1) and (U2) are able to feel the voice quality has improved because of increase in the audio bandwidth. For example, as compared to the quality of speech signals on the traditional analog telephone service, the bandwidth is expanded toward its higher frequency region, allowing the user to more easily listen to the speech sounds of the English consonants, etc., and toward its lower region, allowing a voice output sounding natural to the user, thus improving the overall sound quality.

In contrast, if the user (U1) originates a call meant for the ordinary telephone set 28 connected to the public switched network 12, the phone number of the ordinary telephone set 28 is not displayed on the call originating web page (LT) 36, and therefore the user will operate buttons on the operation unit 53 of the adaptive telephone set 24 in order to specify the phone number of the ordinary telephone set 28.

In response to the specified phone number, the call control procedure is executed to set a connection through the IP telephone adaptor apparatus 22, the center server 21 and the VoIP gateway between the IP network 11 and the public switched network 12, thus allowing speech signals to be transmitted between the user (U1) having the adaptive telephone set 24 and the user (U2) having the ordinary telephone set 28.

It should be noted that the ordinary telephone set 28 and various facilities within the public switched network 12 provide only the narrow-band analog telephone service, and therefore in this case, the speech signals transmitted between the user (U1) and the user (U2) are limited to the bandwidth (300-3400 Hz) of the analog telephone service.

In the case of a telephone call on the IP telephony service utilizing the ordinary bandwidth also, resources within the IP network 11 and the processing capacity of the center server 21 are involved. However, the telecommunications carrier does not levy any high-quality IP telephony service charge on the user's (U1) outgoing call.

It should be noted that even within the IP network 11, all the IP telephone adaptor apparatuses or the IP telephones are not necessarily provided with the capability of broadband voice communication, and therefore, when the user (U1) originates a call to the IP telephone adaptor apparatus or the IP telephone that is not provided with the capability of broadband voice communication, voice signals are transmitted, as in the case of the user (U1) originating a call to the ordinary telephone set 28, in the bandwidth substantially equal to the bandwidth of the analog telephone service without incurring any high-quality IP telephony service charge on the user (U1).

According to this embodiment, each user (e.g. user (U1)) confirms in advance that he or she actually is subscribed to a pay service (high-quality IP telephony service), and then designates with click the indication of a called party (indication of name and/or phone number, etc.) on the call originating web page (LT) 36 to thereafter initiate broadband voice communication, thereby increasing the satisfaction of the user and allowing a business model to be built that would justify charging customers a fee.

Next, a second embodiment to which the invention is applied will be described. In the following, what this embodiment differs from the first embodiment will be described. As seen from the exemplary configuration of a VoIP system 80 of FIG. 7, this embodiment is different from the above-described first embodiment in that this embodiment includes an audio source server 81 operated by the telecommunications carrier. As shown in the figure, the functions of the constituent elements designated by the same reference numerals as those of FIG. 1 are the same as those in the first embodiment, and thus the detailed description thereof will not be repeated.

Figure 7:
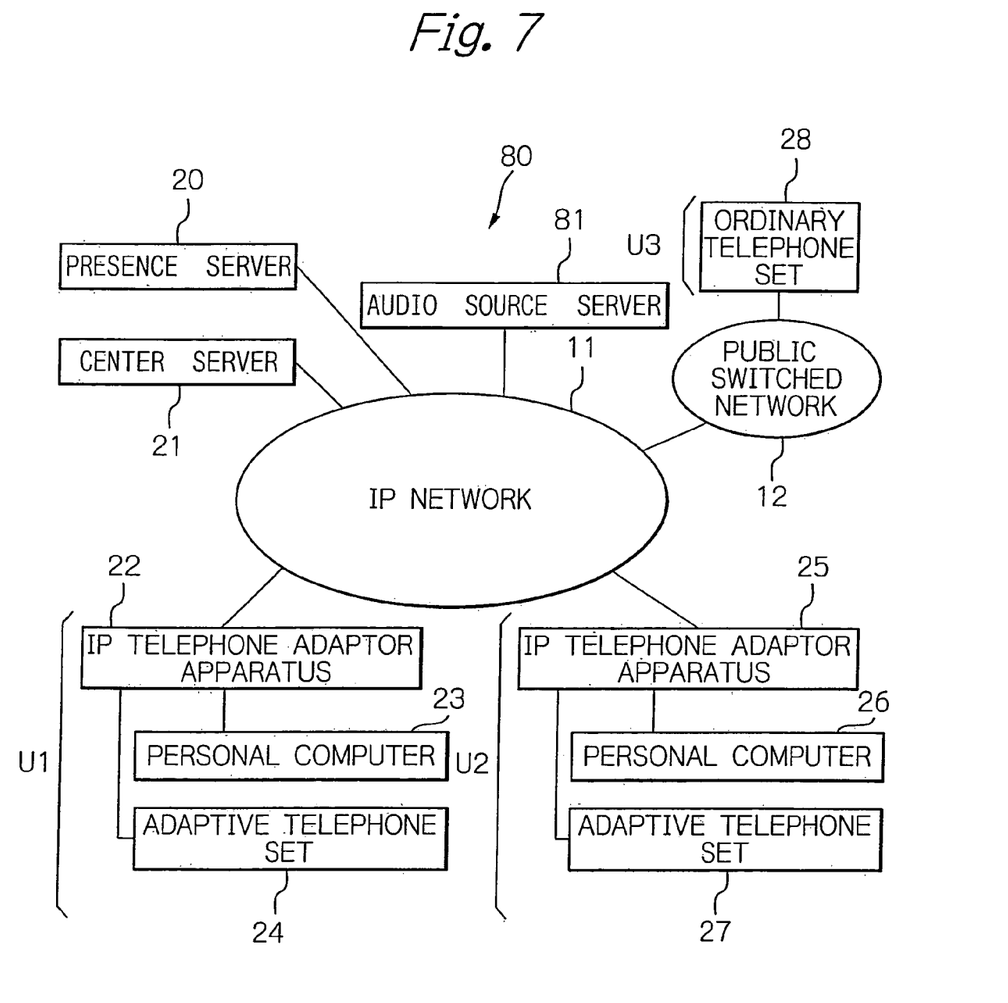
FIG. 7 schematically shows an exemplary overall configuration of a VoIP system according to a second embodiment.

As can be seen from the comparison between FIGS. 1 and 7, the VoIP system 80 of this embodiment is different from the VoIP system 10 of the first embodiment in that the VoIP system 80 includes the audio source server 81.

The audio source server 81 is a server that allows the streaming of an audio source other than the user's (i.e. user (U1)) voice for the purpose of broadband audio signal transmission. The utilization of the improved audio quality over broadband audio signal transmission renders it possible to provide a user with high-quality sound and/or electronically synthesized sound that would not be attained via the typical analog telephone service.

There may be a variety of audio sources. When focusing our attention on aspects of providing users with audio services, the audio sources can be classified into two. The first is a secondary audio source that is provided accompanying the user's voice, and the second is a primary audio source that is alone provided independently of user's voice.

Examples of the secondary audio source include background sound and background music that are played so that the voice of a user (e.g. user (U1)) is overlaid on that sound or music. Examples of the primary audio source include a wake-up alarm message and message of augury, etc., uttered in synthesized voice (e.g. electronic voice after an entertainer).

Figure 8:
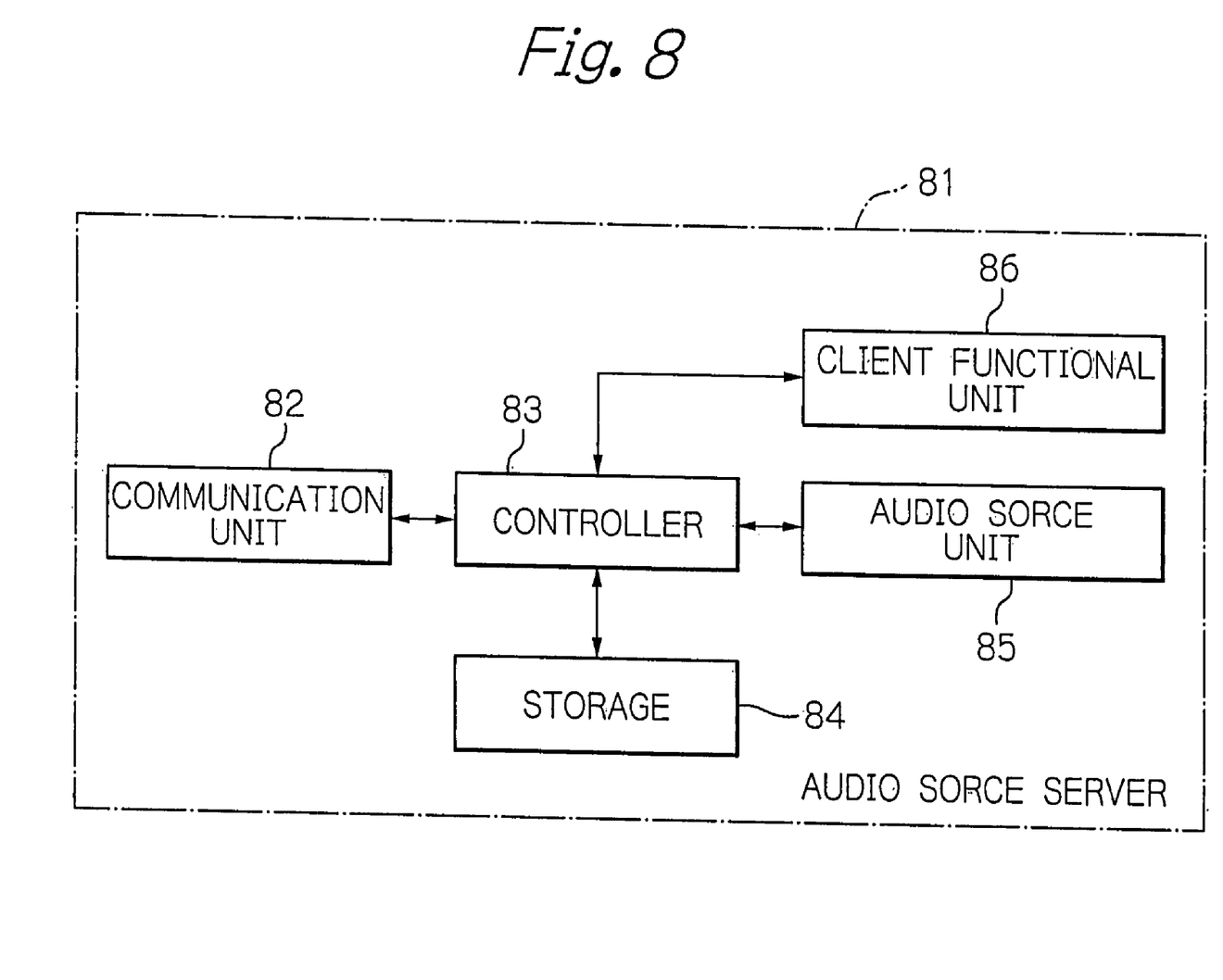
FIG. 8 schematically shows an exemplary general configuration of the primary part of the audio source server included in the embodiment shown in FIG. 7.

The exemplary internal configuration of the audio source server 81 is shown in FIG. 8. As shown in the figure, the audio source server 81 comprises a communication unit 82, a controller 83, a storage 84, an audio source unit 85, and a client functional unit 86. Among those components, the communication unit 82, the controller 83 and the storage 84 correspond to the communication unit 70, the controller 71 and the storage 72 shown in FIG. 6, respectively, and therefore the detailed description of those components will not be repeated.

The audio source unit 85 is operable to store a data file used as secondary and primary audio sources.

The client functional unit 86 operates when the primary audio source is transmitted. For example, when the audio source server 81 initiates a call to the telephone set of a user to which the primary audio source is to be provided, or in contrast when the primary audio source is responsive to an incoming call from a user which is to be provided with the primary audio source to be provided to that user, the client functional unit 86 operates in the same manner as the typical IP telephone set that is provided with the capability of broadband voice communication. The typical IP telephone set is adapted for having a combination of functions of, for example, the IP telephone adaptor apparatus 22 and the adaptive telephone set 24.

An application where the audio source server 81 initiates a call to the telephone set (e.g. adaptive telephone set 24) of a user to which the primary audio source is to be provided is directed to, for example, a wake-up alarm message to be sent to the user. The alarm message is provided in the exemplified manner as will be described in the following. A user (e.g. user (U1)) registers in advance on the audio source server 81 a wake-up time. When maturing the wake-up time, the audio source server 81 initiates a call to the adaptive telephone set 24. The user (U1) off-hooks the handset of the adaptive telephone set 24 to cause him or her to listen to his of her personalized alarm message.

Further, an application where the primary audio source is responsive to an incoming call from a user which is to be provided with the primary audio source to be provided to that user is directed to, for example, the user (U1) listening to an augury. The user (U1) is able to listen to an augury in the manner, for example, described below. When the user (U1) designates with click the indication of an appropriate called party on the call originating web page (LT) 36 to originate a call to the audio source server 81, the call is established with general call control functions, and the audio source server 81 in turn forwards a message of augury carried on electronic voice, etc., to the user (U1). The user (U1) listens to the electronic voice accordingly.

From the view point of the center server 21 responsible for control of a call, voice communication by which a user (e.g. user (U1)) listens to the contents provided from the audio source server 81 may be the same manner as voice communications between the typical end users (e.g. between the users (U1) and (U2)). However, it should be note that when a fee is charged on a user provided with the audio source from the audio source server 81 higher than a fee charged on end users involved in broadband voice communication, a billing system for that purpose may be arranged in the center server 21, etc.

Further, wake-up alarm messages, etc., will be sent from the audio source server 81. In that case, billing would be incurred on a called user (e.g. user (U1)).

It should be noted that the transmission of audio signals from the audio source server 81 is also a kind of broadband audio signal transmission and the audio source server 81 as a called party can be considered the same as the IP telephone adaptor apparatus 25, and therefore the indications of called parties to be displayed on the call originating web page (LT) 36 may include an indication specifying the audio source server 81. Further, if necessary, it is also contemplated that a call originating web page dedicated to the audio source server 81 is available.

Well, when the secondary audio source is provided, the voice of the user (U1) and background sound should be mixed together somewhere on a path between two parties (e.g. users (U1) and (U2)) who communicate with each other. A location where the voice and the sound are mixed may be, for example, the IP telephone adaptor apparatus 22 on the side of a calling party.

When the mixing is completed and thereafter the voice is encoded and encapsulated into an IP packet to be transmitted, the IP packet is decoded by a decoder on the side of a receiving party, thus allowing the voice of the user (U1) on the accompaniment background sound to be listened to by the user (U2) on an opposite party terminal. In contrast, the system may be adapted to provide the user (U1) with the secondary audio source in order to obtain the background sound on the voice of the user (U2) communicating therewith.

In any event, the source of this background sound to be listen to by the user (U1) is a data file that is delivered from the audio source server 81 to the personal computer 23 or the IP telephone adaptor apparatus 22 in response to an HTTP request message transmitted from the personal computer 23.

It is needless to say that, when the user (U1) converses with the user (U3) on the side of the public switched network 12 also, the secondary audio source is likewise provided to the user (U1) in order to allow the user (U3) to hear the voice of the user (U1) mixed with background sound. In this case, however, the background sound listened to by the user (U3) will have its bandwidth limited to the bandwidth of the analog telephone service.

According to the second embodiment, similar advantages to those of the first embodiment are attained. Additionally, in this embodiment, the secondary and primary audio sources provided from the audio source server 81 allow for the provision of additional services to the high-quality IP telephony service.

Well, the third embodiment will be described. In the following, the difference of this embodiment from the first and second embodiments will be described. The instant embodiment is directed to an example corresponding to the second embodiment. This embodiment provides a service associated with television broadcast.

Figure 9:
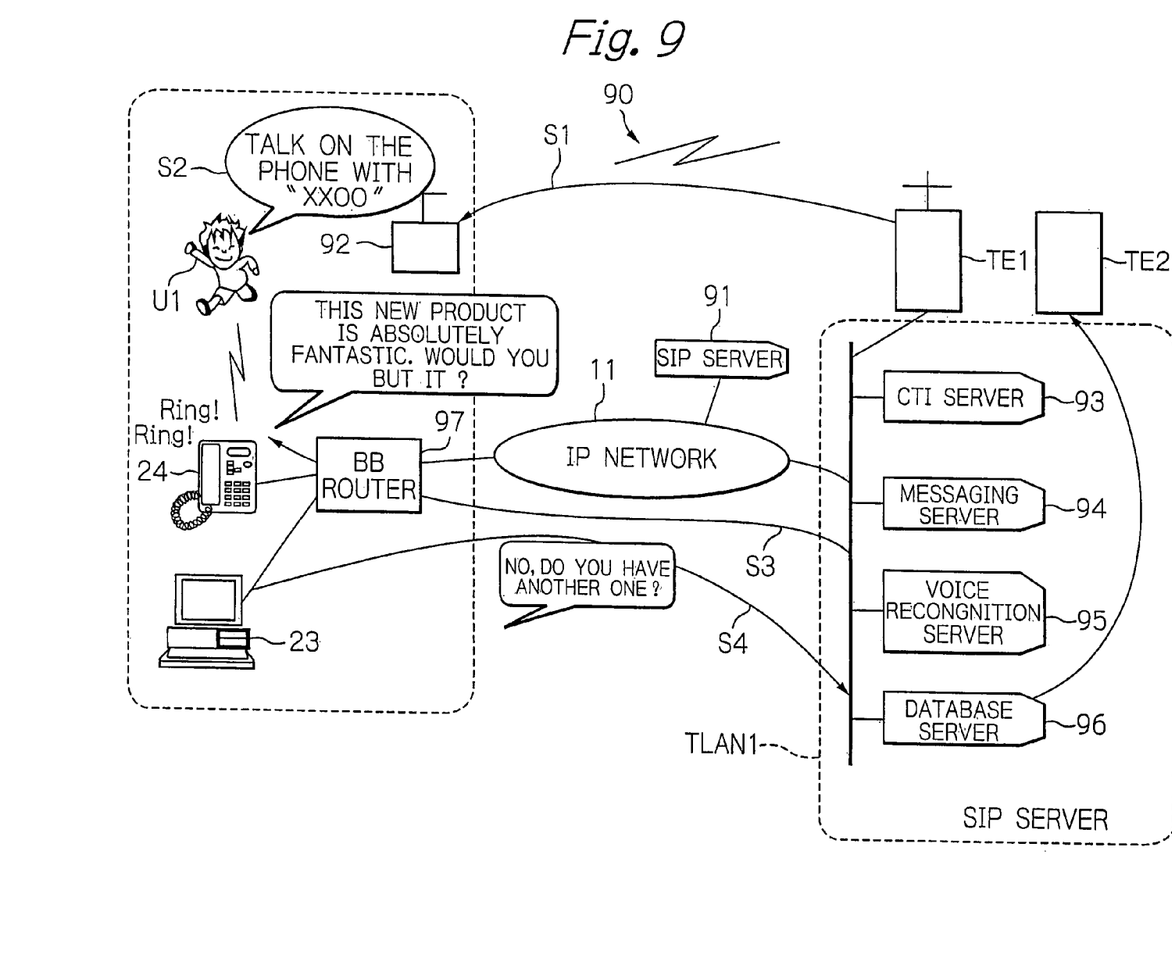
FIG. 9 schematically shows an exemplary overall configuration of a VoIP system according to a third embodiment.

The exemplary overall configuration of a VoIP system 90 of this embodiment is shown in FIG. 9. As seen from the figure, the functions of the elements designated with the same reference numerals as those of FIG. 7 are the same as in the second embodiment shown in FIG. 7, and thus the detailed description thereof will not be repeated. Further, in this embodiment, the function employed by the IP telephone adaptor apparatus 22 is embedded in a BB router 97.

An SIP server 91 connected to the IP network 11 is a consistent element corresponding to the center server 21 (FIG. 6). Incidentally, it is preferred that also in this embodiment, the presence server 20 and the call originating web page (LT) 36 are provided to allow the user (U1) to initiate a call.

In this embodiment, the functions of the audio source server 81 (FIG. 7) are implemented by equipment (TLAN1) in a television station (TE1).

Included in the equipment (TLAN1) are a CTI (Computer Telephony Integration) server 93, a-messaging server 94, a voice recognition server 95, and a database server 96 for managing marketing information. Also, located on the side of the user (U1) is a television receiver 92.

Operations of this embodiment proceed along the steps S1 through S4 shown in FIG. 9. It is assumed that the user (U1) is viewing a TV program broadcast by the television station (TE1) and received by the television receiver 92. In the first step S1, in a commercial message following, or other breaks in, a broadcast content, a singer group "ΔΔΔΔ" highly popular to common TV watchers advertises snacks, for example. In this case, it is contemplated that a specific phone number on the advertisement is broadcast to allow voice communication with that singer group "ΔΔΔΔ". Incidentally, it is also preferred that the phone number on the advertisement is provided as one of the above-described indications of called parties on the call originating web page (LT) 36.

In the subsequent step S2, when the user (U1) wants to talk with that singer group "ΔΔΔΔ" or a popular singer "XXOO" belonging to the group "ΔΔΔΔ", he or she dials that number of the advertisement on the adaptive telephone set 24 to initiate a call to the phone number, or designates with click the indication of an appropriate called party displayed on the call originating web page (LT) 36 on the personal computer 23 to initiate a call.

The call is connected through the call control by the SIP server 91 to the CTI server 93 within the equipment (TLAN1). Afterwards, in the steps S3, S4, the user (U1) listens to an electronic voice of the popular singer "XXOO" broadcast from the messaging server 94, and then indicates a desired product (preferential candy, etc.). The contents of the speech from the user (U1) (or intention of the user (U1)) are recognized by the equipment (TLAN1). In doing so, it is also preferred that the functions of, for example, the voice recognition server 95 and an IVR (Interactive Voice Response) are utilized.

The voice recognition server 95 is used when the user (U1) expresses his or her own intention with voice. The IVR is used when the user (U1) follows electronic voice guidance provided by the equipment (TLAN1) and depresses the buttons on the adaptive telephone set 24 to thereby express his or her own intention.

Due to the broadband voice transmission, what the user (U1) hears at that time is the same as the high-quality voice that is heard through the television receiver 92 when the popular singer "XXOO" advertises, for example, snacks. The user (U1) is thus able to enjoy the voice communication and feel as if he or she were actually involved in voice communication with the popular singer "XXOO".

Further, the television station (TE1) collects information (marketing information) about preferences of the user (U1) based on the knowledge gained through this voice communication, and stores the information in the marketing information database server 96 for future use. Because such marketing information itself is valuable, even if the equipment (TLAN1) costs more to install and to operate, the service of this embodiment is likely to be provided to the user (U1) free of charge or for a minimal fee.

If necessary, the marketing information stored in the database server 96 may be of available for companies (TE2), such as an advertisement agency, other than the television station (TE1), for example.

As described above, according to this embodiment, advantages are attained equivalent to those of the second embodiment using the primary audio source. Additionally, in this embodiment, an entity (in this case, the television station (TE1)) other than the telecommunications carrier operates the equipment (TLAN1) serving as the audio source server 81, and therefore a new business model can be built. Further, in this embodiment, the user (U1) is able to enjoy the voice communication and feel as if he or she were actually talking on the phone with a popular singer, etc.

Now, the fourth embodiment will be described. In the following, the difference between this embodiment and the above third embodiment will be described. Although in the third embodiment, the user (U1) initiates a call, in this embodiment, the television station (TE1) initiates a call.

Figure 10:
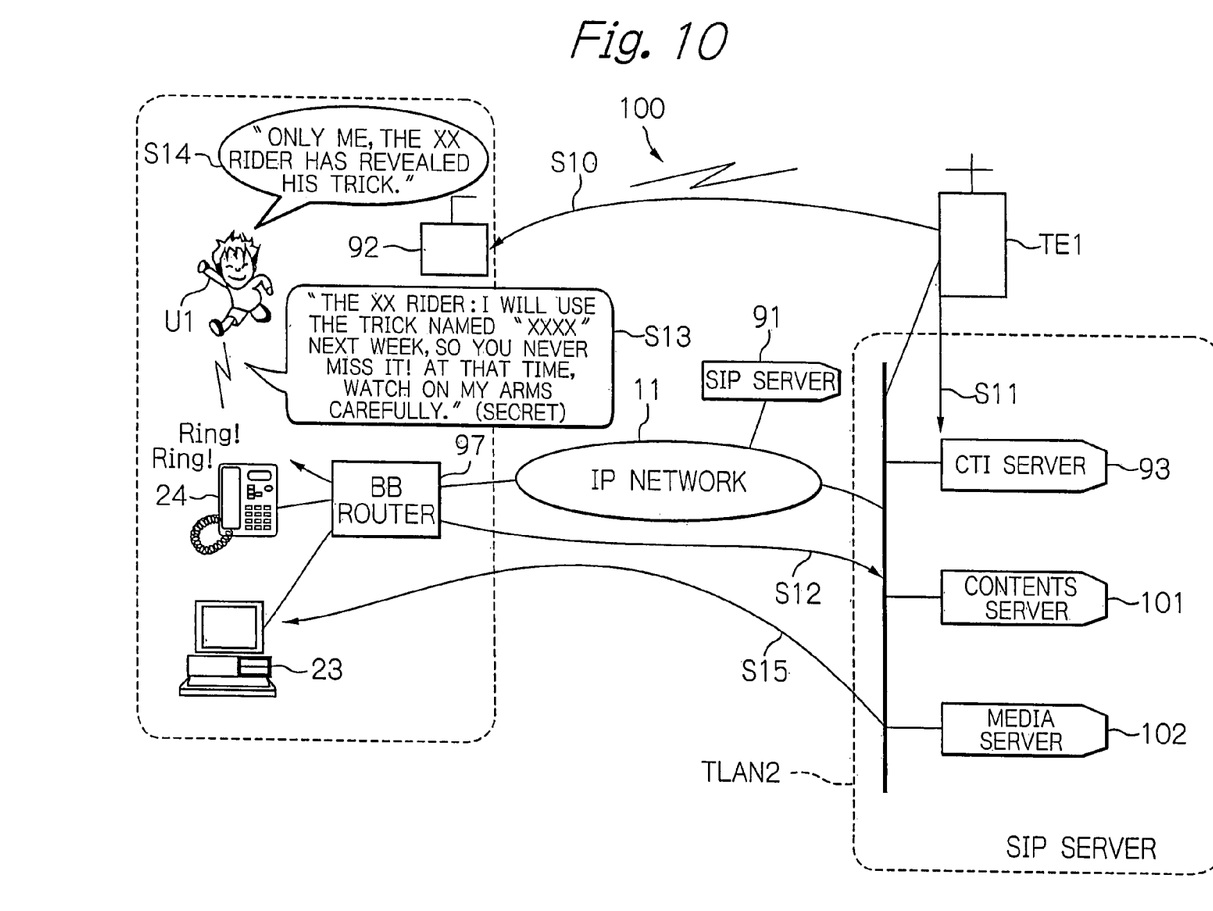
FIG. 10 schematically shows an exemplary overall configuration of a VoIP system according to a fourth embodiment.

The exemplary overall configuration of a VoIP system 100 of this embodiment is shown in FIG. 10. In FIG. 10, the functions of the structural elements designated by the same reference numerals as FIG. 9 are identical with those in the third embodiment, and thus the detailed description thereof will not repeated. Further, in this embodiment, equipment (TLAN2) of the television station (TE1) includes a content server 101 and a media server 102 in addition to the CTI server 93.

Operations of this embodiment proceed along the steps S10 through S15 shown in FIG. 10. Also in this embodiment, the process is initiated when the user (U1) is watching a TV program broadcast by the television station (TE1) and received by the television receiver 92. In this case, it is assumed that the broadcast program is a children's TV program in which a hero character plays. Accordingly, in this embodiment, the user (U1) is a child.

As shown in the figure, in the initial step S10, at the end of this program, specifically at the final clip appearing in a trailer for the forthcoming turn of the program, a main character (hero) playing in the broadcast program sends a message saying that, for example, "I'm going to tell only you the secret about the next week!"

Said equipment (TLAN2) is designed to operate in response to a received broadcast content (step S11). When the CTI server 93 receives from the television station (TE1) the information on the responsive operation and immediately after the main character has sent the message, the CTI server 93 initiates a call to the user (U1) to cause the BB router 97 to ring the adaptive telephone set 24 (S12).

When the user (U1) off-hooks the handset of the adaptive telephone set 24, the main character transmits an electronic voice message that says, for example, "I will use the trick named 'XXXX' next week, so you never miss it! At that time, watch on my arms carefully. (It's secret.)" (S13). This electronic voice is sent from the content server 101 under the various control of the CTI server 93 within the equipment (TLAN2). The broadband voice communication causes the user (U1) to listen at that time to the same high-quality voice as uttered by the main character in the broadcast program and heard to the user on the television receiver 92. Accordingly, the user (U1) can experience sensual pleasure and feel as if he or she were actually receiving a call from the main character.

Further, actually during the forthcoming program, a weapon is hidden behind the arms of the main character and therefore the user (U1) is able to feel as though he or she were sharing secrets with the main character and to enjoy a new option for watching the broadcast program. Various types of messages, specifically to each user, may be prepared in advance, which will be carried on the electronic voice of the main character via the individual adaptive telephones (one of which is the adaptive telephone set 24).

Further, before and after the step S12, an email including the name of the sender, i.e. the main character, is sent to the personal computer 23 from said media server 102, etc. (step S15). Instead of or in addition to the email, a Web page, image information and the like may be sent to the personal computer 23. Generally, the Web is a "pull" communication. However, in an application, such as the web portal (WP) 35, which is designed to have the capability to automatically and periodically send an HTTP request message to an appropriate URL (in this case, the URL of a Web page that gives information about a main character) from the Web browser, it essentially allows to use push style communication.

Further, in a manner similar to the wake up call alarm (morning call) described above, a call may be originated to the user (U1) just before (e.g. five minutes) the beginning of a broadcast program to use the voice of the main character saying "Soon, it begins. Don't miss it." for example in order to prompt the user (U1) to watch the broadcast program.

Moreover, it is also contemplated that the user (U1) registers in advance a useful message dealing with proper education and discipline for his or her son or daughter in the equipment (TLAN2) to convey that message on the voice of the main character via the adaptive telephone set 24 to the son or daughter. When the son or daughter is an enthusiastic fan of that main character and even if the content of the message remains unchanged, the message on the voice of a main character is more likely to be enjoyed by the son or daughter than the user's (U1).

As described above, according to the illustrative embodiment, the advantages similar to those of the second embodiment using the primary audio source are provided. Additionally, in this embodiment, an entity (in this case, television station (TE1)) other than a telecommunications carrier operates the equipment (TLAN1) serving as the audio source server; and therefore a new business model can be built.

Further, in the instant embodiment, there is no need to converse with the user (U1) on an electronic voice as with the third embodiment, and therefore the functions to be handled by the equipment (TLAN2) are likely to be reduced in kind from those required in the third embodiment.

It should be noted that in all of the above embodiments, the network layer protocol of the OSI reference model is not necessarily an IP telephone protocol. As an example, an IPX protocol is likely to be utilized.

Further, although the above description has been given illustratively to the embodiments where communications are provided between the IP telephone adaptor apparatuses provided with the capability of broadband voice communication, the invention is not limited to those embodiments. For example, a system may be adapted for confirming the intension of a user and allowing the user to select optional services (high-quality or typical IP telephony service) prepared dependently on the results of the confirmation.

Additionally, although the above description has been given illustratively to the embodiments where the invention is implemented primarily in hardware, the invention may be implemented in software. Moreover, almost all of the functions implemented in hardware as described above can be implemented in software, and almost all of the functions implemented in software can be implemented in hardware.

The entire disclosure of Japanese Patent Application No. 2003-392569 filed Nov. 21, 2003, including the specification, claims, drawings, and abstract is incorporated herein by reference in its entirety.

While the invention has been described with reference to the specific embodiments, the invention is not limited to the those embodiments. It is to be appreciated that those skilled in the art can change or modify the embodiments without departing from the spirit and scope of the invention.

The invention claimed is:

1. A voice communication system, comprising:
  a plurality of end voice terminals sending and receiving voice information stored under a predetermined communication protocol in a protocol data unit; and
  a management server for managing said end voice terminals, said management server including a management information storage for storing broadband communication management information indicative of whether or not said end voice terminals are capable of predetermined broadband voice communication, a management information updater for updating said broadband communication management information according to any one of introduction, removal, failure, or restoration of the failure of any of the end voice terminals, and a creator for creating image information presenting whether or not each of the end voice terminals is capable of broadband voice communication, for selecting a target end voice terminal among the end voice terminals on the basis of said broadband communication management information, for delivering said image information to each of the end voice terminals to be displayed thereon, and for placing a call with the target end voice terminal.

2. The system in accordance with claim 1, further comprising an audio source server for providing high quality voice information as a high quality voice service to the target end voice terminal, when the capability target end voice terminal is capable of broadband voice communication.

3. A method of voice communication in a voice communication system, the system comprising a plurality of end voice terminals, including a target end voice terminal, each sending and receiving voice information stored under a predetermined communication protocol in the protocol data unit, and a management server for managing each of the end voice terminals, said method comprising the steps of:

managing subscriber information indicative of whether or not the end voice terminals are capable of predetermined broadband communication;

updating said subscriber information according to any one of introduction, removal, failure, or restoration of the failure of each of the end voice terminals;

creating image information presenting whether or not each of the end voice terminals is capable of broadband voice communication;

selecting a target end voice terminal from among the plurality of end voice terminals on the basis of said broadband communication management information;

delivering said image information to each of the end voice terminals to be displayed thereon; and placing a call with the target end voice terminal.

4. The method in accordance with claim 3, further comprising providing high quality voice information as a high quality voice service to the target end voice terminal, when the capability-target end voice terminal is capable of broadband voice communication.

* * * * *

UNITED STATES PATENT AND TRADEMARK OFFICE
CERTIFICATE OF CORRECTION

PATENT NO. : 7,822,014 B2  
APPLICATION NO. : 10/579677  
DATED : October 26, 2010  
INVENTOR(S) : Ryo Sasaki et al.

Page 1 of 1

It is certified that error appears in the above-identified patent and that said Letters Patent is hereby corrected as shown below:

Title Page, Item 75 (Inventor)

"Ohoba" should be changed to --Chiba--

Signed and Sealed this
Tenth Day of April, 2012

David J. Kappos
*Director of the United States Patent and Trademark Office*